July 5, 1949.                    R. S. CURRY, JR                    2,474,830
                    SERVOMOTOR AND CONTROL SYSTEM THEREFOR
Filed June 29, 1946                                          3 Sheets-Sheet 1
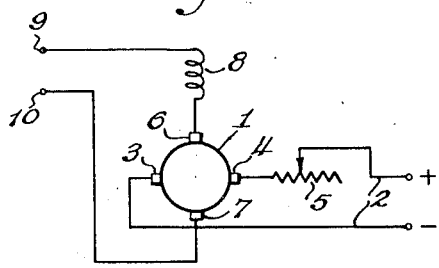
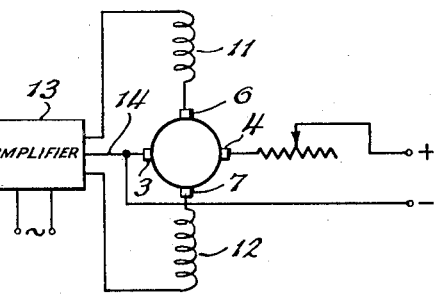
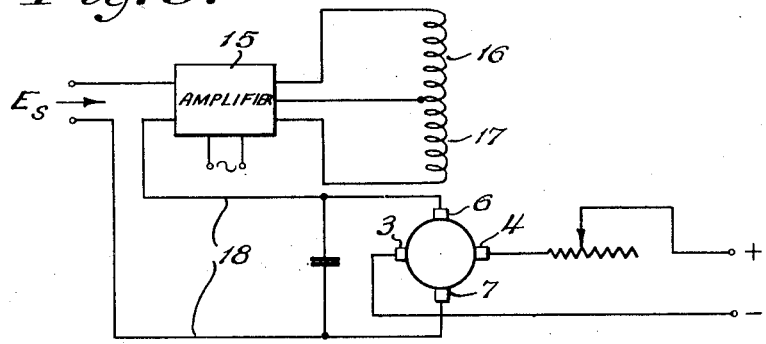
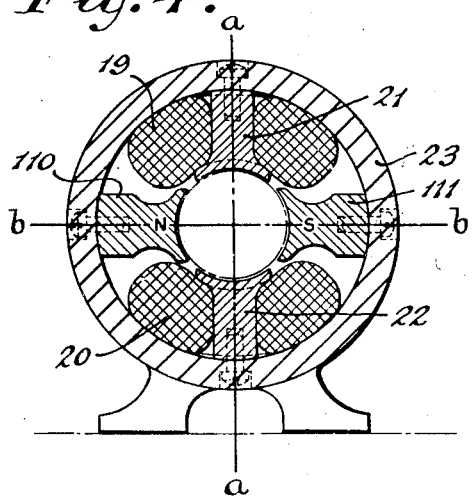
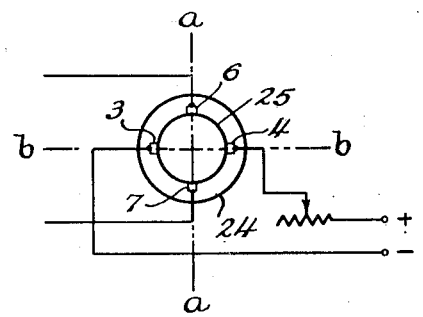
INVENTOR
ROBERT S. CURRY, JR.
BY
ATTORNEY.

July 5, 1949. R. S. CURRY, JR 2,474,830
SERVOMOTOR AND CONTROL SYSTEM THEREFOR
Filed June 29, 1946 3 Sheets-Sheet 2

INVENTOR
ROBERT S. CURRY, JR.
BY Herbert H. Thompson
his ATTORNEY.

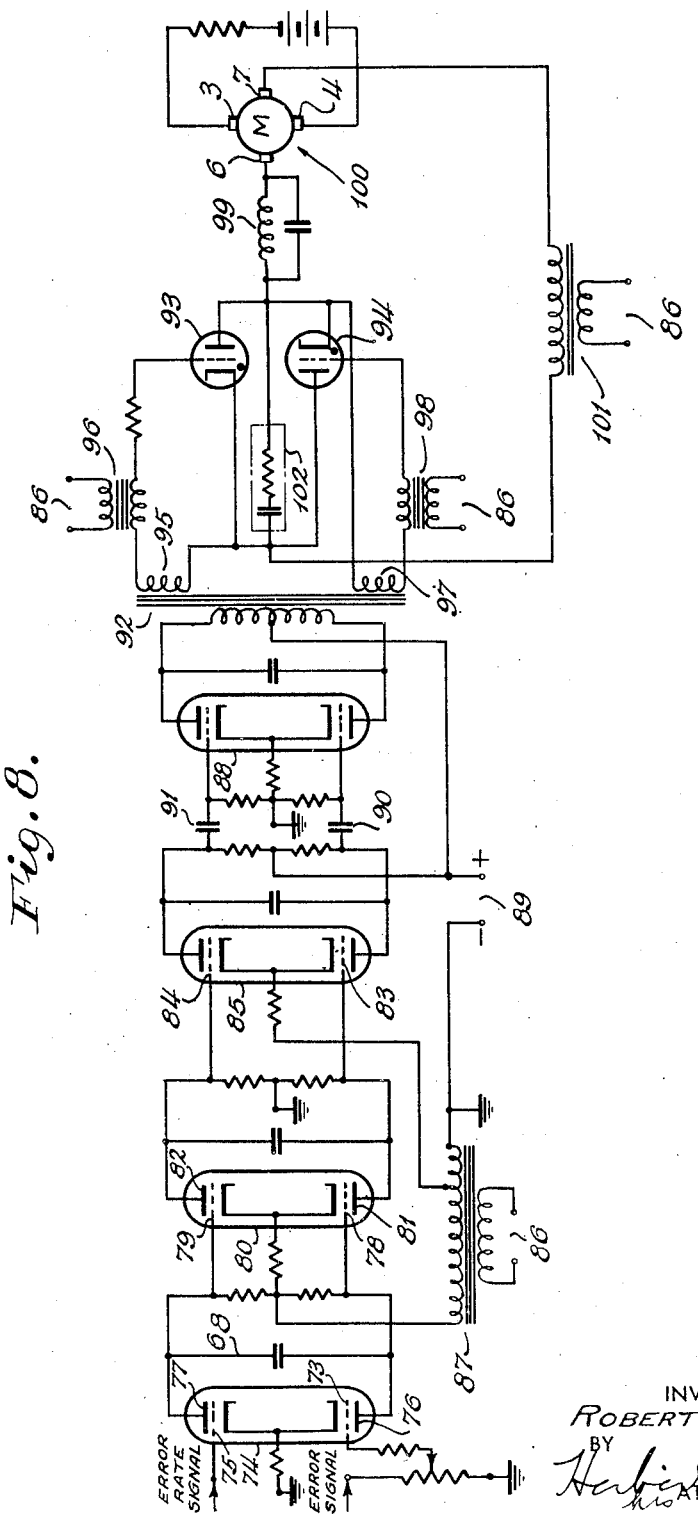

Patented July 5, 1949

2,474,830

UNITED STATES PATENT OFFICE 2,474,830

SERVOMOTOR AND CONTROL SYSTEM THEREFOR

Robert S. Curry, Jr., Baldwin, N. Y., assignor to The Sperry Corporation, a corporation of Delaware Application June 29, 1946, Serial No. 680,352

15 Claims. (Cl. 318—331)

My invention particularly relates to a servomotor construction wherein a voltage proportional to the speed at which the motor is operating is developed within the motor and applied in such manner as to oppose the applied voltage to said motor which controls the speed thereof, whereby to obtain velocity-damping; and my invention also resides in providing a servo system including such a motor and in which the speed voltage derived from the motor is employed in a degenerative fashion to produce velocity-damping.

In the art of automatic servomotor controls, it is customary to drive a load in a given direction and to a desired displacement and/or at a predeterminable speed by means of a servomotor which, in turn, is controlled by a signal such as a signal voltage which is a measure of the displacement or speed to be established by the servo or which is a measure of the angular displacement between an axis of the load and a reference axis or member. In such systems, elasticity in the system and the inertia of the load, among other things, materially affect the precision with which the load may be controlled as, for example, closely to follow movements of the reference member in the illustration last above set forth. As a result of such factors, especially under decelerating conditions or when the load has been brought into substantial correspondence with the reference member, the system tends to hunt or oscillate about the position providing zero signal input thereto. This instability has been overcome by obtaining a signal or a voltage proportional to the speed at which the motor or its load is driven and applying this signal in degenerative fashion to the amplifier which, in response to a signal voltage, controls the speed and direction of operation of said motor.

In the present invention, I propose to provide a servomotor control system wherein a voltage proportional to motor speed is derived from the motor itself and applied in a novel and degenerative manner to oppose the voltage or signal which controls the speed and direction of rotation of the motor, whereby to provide damping and to minimize hunting of the motor.

It is therefore a primary object of the present invention to provide a motor in which a voltage proportional to the speed thereof is derived from said motor and applied in degenerative fashion to the circuit which supplies the speed and direction controlling voltage to said motor whereby to provide damping.

It is another object to provide a motor of the foregoing character in which the motor field windings are connected in series with the speed voltage generated therein and in such manner that such speed voltage opposes the current in the field windings.

Still another object resides in providing motors of the foregoing characters which additionally comprise means such as interpoles and preferably permanent magnet interpoles for increasing the cross field within said motor which produces the voltage in the armature thereof, which voltage is proportional in magnitude to the motor speed.

Another object resides in providing a motor control system for motors of the above characters in which an amplifier under the control of a signal voltage supplies current to the field windings of the motor and the speed voltage derived from said motor is applied in degenerative fashion to said amplifier.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

With the foregoing and still other objects in view, my invention includes the novel elements and the combinations and relative arrangements thereof described below and illustrated in the accompanying drawings, in which Fig. 1 schematically illustrates one form of my novel motor which is arranged to provide velocity-damping;

Fig. 2 is a schematic representation of a motor of my invention having differentially wound field windings connected in the output of a balanced amplifier;

Fig. 3 schematically shows a motor of my invention associated with a balanced amplifier and with the speed voltage derived therefrom connected in degenerative fashion to said amplifier;

Fig. 4 is a somewhat diagrammatical view of a cross-section of the motor stator;

Fig. 5 schematically illustrates the armature of the motor of Fig. 4, showing the relative relationship of the brushes to each other and to the stator;

Fig. 8 is a wiring diagram of still a further modification.

Figure 6:
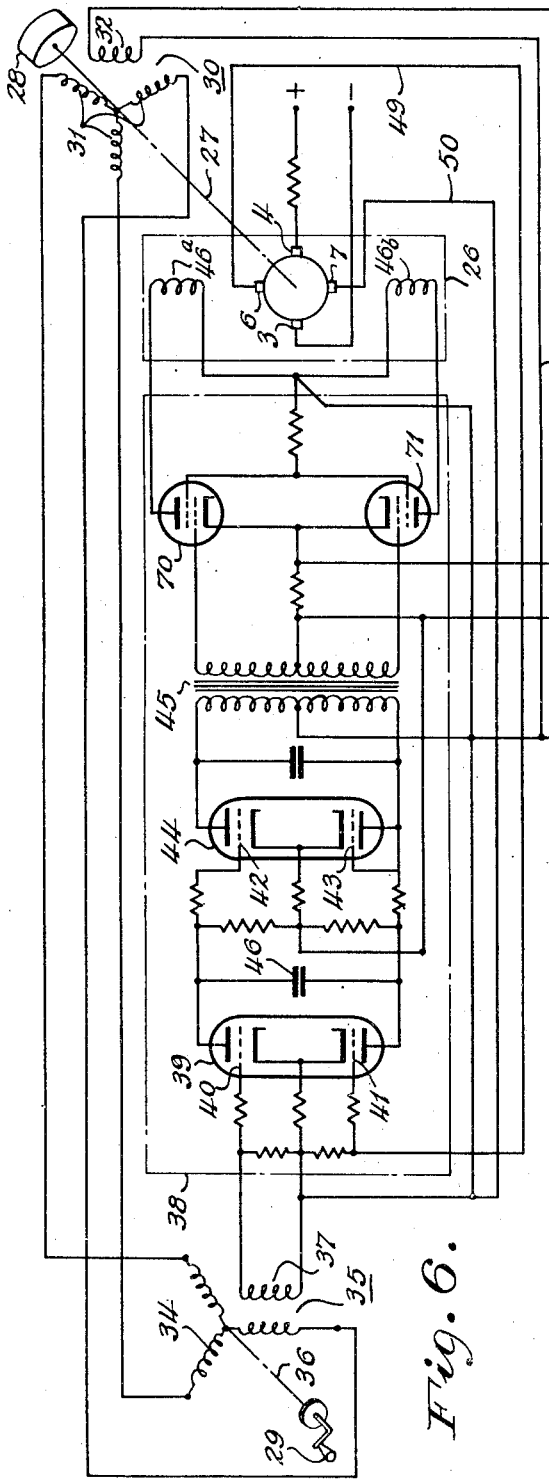
Fig. 6 is a wiring diagram of an exemplary servo-motor control system embodying the present invention.

It will be understood that the present invention, in its broader aspects, relates to any type of motor or motor-control system wherein a voltage is developed in the motor proportional to the speed of rotation thereof and which voltage is applied in degenerative fashion to the motor control circuit as herein taught. However, for exemplary purposes and as an illustration of a preferred embodiment of the present invention, I have herein disclosed a D. C. motor having an armature and commutator which is energized from a source of constant or substantially constant current and the speed and direction of rotation of which is controlled by the field windings. That is, the polarity of the voltage applied to the field windings will determine the direction of rotation and the magnitude of the voltage will determine the rate of rotation. Referring now to Fig. 1, I indicates generally the armature, including the commutator, of one form of my invention to which is supplied a constant current through the medium of supply leads 2 and brushes 3 and 4 which constitute a first pair of brushes engaging the commutator and so positioned as to provide high torque. Regulation of the desired amount of armature current may be obtained in any desired manner as by means of the variable resistor 5.

It is generally known, that the armature windings of a motor of this character develop a magnetic field at right angles to the motor control field developed by the field windings and, due to the rotation of the armature conductors in the former or quadrature field, a voltage is generated therein which is proportional to the speed of rotation of the armature. This speed voltage is dependent both upon the strength of the quadrature field and the speed of rotation and since the quadrature field strength is substantially a constant, the voltage so generated varies with and is substantially proportional to motor speed. By employing a second pair of brushes as indicated at 6 and 7, placed in engagement with the commutator and in generally quadrature relation to the brushes 3, 4 the speed voltage will appear across these quadrature brushes; when these brushes are correctly positioned, no voltage will be produced thereacross which may arise through interaction between the armature and the main control field indicated by the winding 8.

In accordance with the present invention, I propose to use the speed voltage which is proportional to the speed of rotation of the motor and apply it in a degenerative fashion to the motor control circuit. For example, in Fig. 1, I apply this voltage directly in the circuit of the field winding 8 by connecting the field and armature windings in series through the brushes 6 and 7. Terminals 9 and 10 are adapted for connection with any suitable source of reversible polarity, unidirectional voltage, such as the voltage output of an amplifier or a generator as illustrated in various of the figures in the drawings.

It will be observed that the speed voltage so generated when applied in opposition to the field current will oppose rotation of the motor and the effect thereof will be greater at higher speeds and with increased rates of reduction of control voltage applied to the field windings. In this way, therefore, the speed voltage will function to reduce hunting and prevent undue oscillations in the system embodying a motor of this construction.

In Fig. 2, I have schematically illustrated a motor of the general character of that shown in Fig. 1, but embodying differential field windings 11 and 12. These field windings are energized in a differential manner from the output of a balanced differential, phase-sensitive or D. C. amplifier 13 which in turn may be controlled from a suitable source of A. C. or D. C. signal voltage. The signal voltage input of amplifier 13 functions to unbalance the amplifier thereby unbalancing the field currents in the differential field windings 11 and 12 and the predominating current will control the direction and the difference current value will control the rate of rotation of the motor. In this embodiment, it will be seen that the field windings 11 and 12 are connected respectively to quadrature brushes 6 and 7 and that the common return lead 14 for the differential field windings is connected between the amplifier and brush 3. In this manner, the speed voltage generated across brushes 6 and 7 may be employed to oppose the predominant field current and thereby provide damping.

Further in accordance with my invention, I propose to feed back the speed voltage which is derived across quadrature brushes 6 and 7 and apply it in degenerative fashion to the amplifier. This embodiment of my invention is illustrated in Fig. 3 wherein the amplifier 15 under the control of a signal voltage ($E_s$) supplies current in a differential manner to the differential field windings 16 and 17 of the motor. The quadrature brushes 6 and 7 are connected through leads 18 to the input of the amplifier as shown and the speed voltage is applied to the input in degenerative fashion or in opposition to the signal voltage. Obviously, the speed voltage feed-back circuit may be connected in any suitable manner with the amplifier and not necessarily in the input circuit as herein shown.

In the foregoing, I have disclosed how a voltage proportional to the speed of the motor may be obtained through interaction between the armature windings thereof and a field in quadrature relation to the control field provided by the stator field windings. This quadrature field may be increased and in the preferred embodiments of my invention, I propose to increase the quadrature field strength by employing means, associated with the motor stator, for obtaining this result. Preferably, I employ inter-poles as shown in Fig. 4 at 110 and 111 which are so positioned as to augment the quadrature field. In Fig. 4, the control field windings are indicated at 19 and 20, respectively surrounding the poles 21 and 22 which are secured to the stator or motor housing 23. The inter-poles, which are preferably permanent magnet inter-poles, are also secured to the stator 23 and positioned substantially in quadrature relation with the field poles 21 and 22. These permanent magnet inter-poles are arranged with their inner ends or tips of opposite polarity so as to produce a non-reversing, unidirectional field in aiding relation to the quadrature field produced by the armature which is of a unidirectional nature and non-reversing because of the fixed polarity of the armature excitation source.

The desirability of providing inter-poles and also connecting the quadrature brushes in circuit with the field windings should be apparent from the following. The inter-poles serve to produce a larger quadrature field and therefore speed voltages of higher magnitudes. The permanent magnet inter-poles serve to reduce flux leakage between the field pole tips because of the high reluctance of permanent magnet materials. The inter-poles, however, tend to produce a reduction in torque output of the motor but additional torque is provided by feeding the field current through the armature. Hence, any loss in torque due to such inter-poles is adequately compensated for by connecting the quadrature brushes directly in circuit with the field windings as hereinabove described.

In Fig. 5 I have schematically shown the armature and commutator for the motor of Fig. 4, the armature being indicated at 24 and the commutator at 25. The axes a—a and b—b of Figs. 4 and 5 serve to indicate the relative relationship between the brushes 3, 4 and the quadrature brushes 6, 7 and the stator construction. It will be observed that the quadrature brushes 6 and 7 are so positioned that no voltage will appear thereacross due to the control field flux produced by the field windings 19 and 20.

Figure 7:
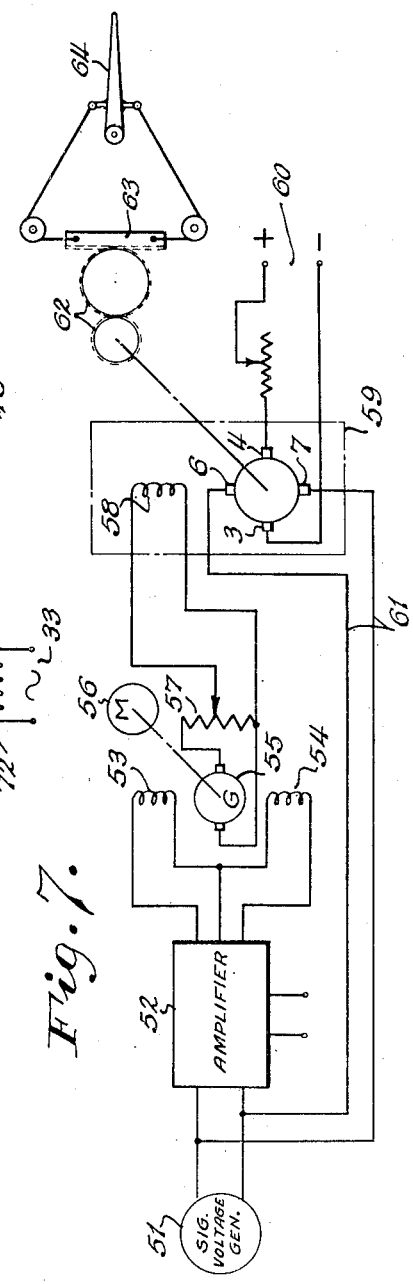
Fig. 7 is a modified schematic view of a servo system embodying my novel motor-control arrangement.

In Figs. 6 and 7, I have shown preferred forms of servomotor control systems embodying motors of the character hereinabove described and in Fig. 6 I have shown, for exemplary purposes, one form of a balanced amplifier which may be employed to control the differential field windings of the motor in accordance with a control signal.

Referring now to Fig. 6, I have shown a system embodying a repeat back in which the motor is controlled to drive a suitable load or a predetermined axis thereof in positional agreement with a reference member or axis. The motor is indicated generally by the dash line rectangle 26 and is of the general character of that schematically shown in Fig. 3. The output shaft of motor 26, indicated by the dash-dot line 27, is shown as connected in any suitable manner with the load 28. This load may be of any character and, we may assume, comprises a member which is to be driven in positional agreement with a reference such as the hand crank 29, that is, said member of the load is to be rotated in synchronism with rotation of the crank 29. For repeat back purposes, I have shown a self-synchronous system including a transmitter indicated generally at 30 comprising the Y-connected, polycircuit rotor windings 31 and the single phase stator winding 32 which is connected with a suitable source of alternating current 33. The rotor windings are connected in polycircuit fashion to corresponding rotor windings 34 of a signal transformer 35. Rotor 34 is connected with the hand crank 29 through suitable connections schematically represented by the dash-dot line 36 and it will be understood that when the load member and the crank 29 are in positional agreement, no voltage will appear across the single phase stator winding 37 of transformer 35. When these synchro elements reflect a positional disagreement between the load and control or reference member, a signal voltage will appear across stator winding 37 which has a phase sense with respect to the phase of the reference voltage or A. C. source 33 which is dependent upon the direction of disagreement and the magnitude of said voltage will be dependent upon the amount of such disagreement.

The signal voltage derived from transformer 35 is supplied to one half or channel of a balanced amplifier represented generally by the dash-dot outline 38. For illustration purposes, this amplifier is somewhat of the general character of that shown in application Serial No. 448,040 which was filed in the U. S. Patent Office on June 22, 1942, and assigned to the assignee of the present invention, said application having now matured into Patent No. 2,415,819, dated February 18, 1947. Briefly, the amplifier 38 comprises duplex tube 39, and to one of the control grids 40 of control grids 40 and 41 thereof is connected the signal voltage derived from transformer 35. Tube 39 functions as an amplifier and the output from the plates thereof is directly connected with the control grids 42 and 43 of a second duplex amplifier tube 44 functioning as a rectifier to supply its plate outputs in differential fashion to the primary windings of coupling transformer 45. It will be observed that the circuit is arranged for balanced operation so that when zero signal voltage is supplied thereto, equal and oppositely flowing currents will flow through the differential primary windings of transformer 45. Furthermore, the two plates of each tube are energized in in-phase relation but the plates of tube 39 are energized out of phase with the plates of tube 44. Since the output of tube 39 is directly connected with the control grids of tube 44 and the plates of these tubes are energized in out-of-phase relation, a condenser 46 is connected across the output of tube 39 to sustain the output voltage and to impress it on the grids of tube 44 when the plates thereof are energized in a positive sense. The stator winding of signal transformer 30 is connected by leads 48 with the A. C. source 33 which is also employed in energizing the plates of the amplifier tubes and hence the source 33 may be used as a reference phase for the signal voltage input to the amplifier.

The secondary windings of coupling transformer 45 are connected respectively in push-pull fashion to the control grids of power tubes 70 and 71. As shown, the anodes of the tubes in all three stages of the amplifier derive alternating plate potentials from transformer 72 which is energized from the A. C. source 33. The plate outputs of tubes 70 and 71 are supplied respectively to the differential field windings 46a and 46b of the motor 26.

In accordance with my invention, the speed voltage developed across brushes 6 and 7 is fed back in degenerative fashion to the input of the amplifier or in a manner to oppose the signal derived from the transformer 35. For example, quadrature brushes 6 and 7 of the motor 26 are connected through leads 49 and 50 to the circuit of grid 41 of tube 39, applying the speed voltage thereon. As a result, the D. C. output of amplifier 38 which is fed to the differential field windings 46a and 46b is reduced in accordance with the magnitude of the speed voltage so fed back and the speed voltage in this manner functions to damp and prevent hunting of the motor.

In Fig. 7, I have schematically shown a modified system in which no positional repeat-back mechanism is employed and in which the field current for the motor is derived from a generator providing reversible polarity D. C. thereto. A signal is derived from a signal voltage generator indicated generally at 51 which may be of any well known type and is supplied to the input of amplifier 52. The output of the amplifier is connected to the differential field windings 53 and 54 of a generator, the armature 55 of which is driven by a suitable motor 56 which is preferably of a constant speed type. Any desired fractional portion of the output of the generator may be taken from the potentiometer 57 and supplied to the field winding 58 of the servomotor indicated generally at 59. Servomotor 59 is of the general character hereinabove described and its armature is excited from a constant source 60. The quadrature brushes 6 and 7 are connected through leads 61 to apply the speed voltage in degenerative fashion to the input of amplifier 52. In this system, the output of the generator is controlled in accordance with the signal voltage derived from signal voltage generator 51 and the opposing speed voltage taken from brushes 6 and 7. Upon reversal either in polarity or phase of the signal voltage, or the combined signal and speed voltages, the polarity of the output of the generator reverses and hence the direction of rotation of motor 59 reverses, and damping is effected by the speed voltage.

In Fig. 7, the servomotor 59 is illustrated as driving rack 63 through the medium of gears 62 and the rack through suitable pulley and cable connections operates a control surface such as a trim tab 64 of an aircraft. In this system, a repeat back to the signal voltage generator is obtained through the craft itself, since the trim tab varies the attitude of the craft with respect to a reference and thereby serves to zero the error signal when the correct attitude has been attained.

In Fig. 8, I have diagrammatically shown a modified form of my invention wherein a single field coil is connected in series with the quadrature brushes and controlled by the output of a balanced amplifier.

In Fig. 8, the balanced-type amplifier comprises two channels, the outputs of which are equal and of opposing senses when zero signal voltage is applied to the input. Preferably, as shown, the amplifier comprises a plurality of stages for the purpose of providing the necessary gain with improved wave form and the reduction or elimination of noise and harmonics whereby to provide improved or proper thyratron control.

In the exemplary showing, the error signal is applied to the grid 73 of twin triode 74 and the error rate signal is applied to the other grid 75. These signals may both be unidirectional voltages and the error rate signal is proportional in magnitude to the rate of change of the error signal. With an error signal of one polarity sense or the other, the control voltages in that channel of the amplifier which is controlled by the error signal will exceed or diminish below the control voltages in the other channel and similarly the error rate signal will produce a correspondingly greater increase or drop in the control voltages in the error signal channel.

The plates 76, 77 of tube 74 are respectively connected directly to the grids 78 and 79 of tube 80 and the plates 81 and 82 of tube 80 are directly coupled respectively with the grids 83 and 84 of tube 85. As in the amplifier shown in Fig. 6, the plates of tube 74 are energized in phase and the two plates of tube 80 are also energized in phase but the pairs of plates are energized in out-of-phase relation from a suitable alternating voltage source 86 through transformer 87. Condenser 88 serves to hold over the voltage outputs from tube 74 to the next half cycle when the plates of tube 80 are energized. The stages, including tubes 74 and 80, serve as discriminating-amplification stages for the purpose of eliminating noise and harmonics in the signal voltages.

The stage, including tube 85, functions as a modulator, alternating current being supplied from taps on the secondary of transformer 87 to the circuits of both grids 83 and 84 thereof as shown. The plates of tube 85 and also the plates of the next succeeding tube 88 which is comprised in a voltage gain stage are energized from a suitable D. C. source 89. The A. C. voltages derived from the plates of tube 85 are coupled as by means of coupling condensers 90 and 91 to the grids of tube 88. These voltages represent the A. C. counterparts of the original error and error rate signals. The plate outputs of tube 88 are coupled through transformer 92 to the grids of two thyratron tubes 93 and 94. One secondary 95 of transformer 92 is connected in series with an A. C. biasing voltage derived from the secondary of transformer 96, and the other secondary 97 of transformer 92 is connected in series with an A. C. biasing voltage derived from the secondary of transformer 98. The primaries of transformers 96 and 98 may both be connected to a suitable source of A. C. voltage such as source 86. Hence, both the thyratron tubes 93 and 94 are provided with an A. C. bias to control the firing thereof and the grids of these tubes are also controlled respectively by the signal voltages derived from the secondaries 95 and 97 of the coupling transformer.

It will be observed that the tubes 93 and 94 are connected in back-to-back relation and in series with the single field winding or coil 99 of motor 100. The quadrature brushes 6 and 7 of the motor are connected in series with field coil 99 and through the thyratron circuits across a suitable A. C. source such as the secondary of transformer 101, the primary of which may be connected to the A. C. source 86. The plate-cathode circuits of both thyratron tubes include a buffer network indicated generally at 102 which preferably comprises a series connected resistance and capacitance for the purpose of increasing the life of the thyratron.

The brushes 3 and 4 of the motor 100 are connected across a source of substantially constant direct current, as shown, and it will be observed that the thyratron tubes 93 and 94 respectively control currents flowing in opposite directions through the field winding 99 and the armature windings across the quadrature brushes 6 and 7. Hence, the magnitude and sense of the predominating current flow in the field circuit of the motor will depend upon the polarity or phase sense of the error signal supplied to the amplifier input and the magnitude thereof will depend upon the magnitude or amplitude of the error signal. Of course, as above indicated, the error rate signal will modify the effect of the error signal, and the damping voltage will oppose.

Briefly, the embodiment of my invention shown in Fig. 8 comprises a motor having a control field winding, which motor is controlled in its direction and rate of operation by thyratrons which are, in turn, controlled by the output of a balanced amplifier in accordance with error or error rate signals supplied to the input of said amplifier. Damping is effected by applying the speed voltage derived from the armature of said motor directly in series with the control field winding.

Since many changes could be made in the above construction and many apparently widely different embodiments of this invention could be made without departing from the scope thereof, it is intended that all matter contained in the above description or shown in the accompanying

What is claimed is:

1. A velocity-damped motor comprising a stator having field windings and a rotatable armature having armature windings cooperating with the field developed by said field windings when said field and armature windings are excited to produce armature torque, a source of control voltage, a circuit connecting said voltage in controlling relation with said field windings to produce an armature speed in accordance with the magnitude thereof, means for deriving from said armature windings a speed voltage proportional to the speed of rotation of said armature, and means for applying said speed voltage in degenerative fashion to said circuit.

2. A velocity-damped motor comprising a stator having field windings and a rotatable armature having armature windings cooperating with the field developed by said field windings when said field and armature windings are excited to produce armature torque, a source of control voltage, a circuit connecting said voltage in controlling relation with said field windings to produce an armature speed in accordance with the magnitude thereof, means for deriving from said armature windings a voltage proportional to the speed of rotation of said armature, and means for applying said speed voltage in degenerative fashion to the voltage supplied to said field windings.

3. A velocity-damped motor comprising a stator having field windings and a rotatable armature having armature windings and a commutator, a source of armature exciting current, a pair of brushes engaging said commutator and connected to said current source, a source of control voltage, a circuit connecting said control voltage in controlling relation with said field windings to control the speed of said armature, a second pair of brushes engaging said commutator in generally quadrature relation to said first-mentioned pair of brushes, and means for applying the voltage developed across said second pair of brushes in degenerative fashion to said circuit.

4. A velocity-damped motor comprising a stator having field windings and a rotatable armature having armature windings and a commutator, a source of armature exciting current, a pair of brushes engaging said commutator and connected to said current source, a source of control voltage adapted for connection with said field windings, and a second pair of brushes engaging said commutator in generally quadrature relation to said first-mentioned pair of brushes, said second pair of brushes being connected in circuit with said field windings to connect said field and armature windings in series with said control voltage source.

5. A velocity-damped motor comprising a stator having field windings and a rotatable armature having armature windings and a commutator, a source of armature exciting current, a pair of brushes engaging said commutator and connected to said current source, a source of control voltage, a circuit connecting said control voltage in controlling relation with said field windings to control the speed of said armature, a second pair of brushes engaging said commutator in generally quadrature relation to said first-mentioned pair of brushes, means for applying the voltage generated across said second pair of brushes in degenerative fashion to said circuit, and magnetic means associated with said stator for increasing the quadrature field strength.

6. A velocity-damped motor comprising a stator having field windings and a rotatable armature having armature windings and a commutator, a source of armature exciting current, a pair of brushes engaging said commutator and connected to said current source, a source of control voltage, a circuit connecting said control voltage in controlling relation with said field windings to control the speed of said armature, a second pair of brushes engaging said commutator in generally quadrature relation to said first-mentioned pair of brushes, means for applying the voltage generated across said second pair of brushes in degenerative fashion to said circuit, and permanent magnet inter-poles for increasing the quadrature field strength.

7. A velocity-damped motor comprising a stator having field windings and a rotatable armature having armature windings and a commutator, a source of armature exciting current, a pair of brushes engaging said commutator and connected to said current source, a source of control voltage, a circuit connecting said control voltage in controlling relation with said field windings to control the speed of said armature, a second pair of brushes engaging said commutator in generally quadrature relation to said first-mentioned pair of brushes, inter-poles for increasing the quadrature field strength, and means for applying the voltage developed across said second pair of brushes in degenerative fashion and in series in the circuit of said field windings.

8. In a system including a velocity-damped motor comprising a stator having field windings and a rotatable armature cooperating with the field developed by said field windings to produce armature torque when said motor is energized, a source of signal voltage, an amplifier connected to receive said signal voltage and having its output connected to energize the field windings of said motor whereby to control the armature speed in accordance with the magnitude of said signal voltage, means for deriving from said armature a voltage proportional to the speed of said armature, and means for applying said voltage in degenerative fashion to said amplifier.

9. In a motor control system of the character described, a motor comprising a stator having field windings and a rotatable armature having armature windings and a commutator, a constant armature current source, a pair of brushes engaging said commutator and connected to said constant current source, a source of signal voltage, a circuit including an amplifier connecting with the signal voltage and in controlling relation to said field windings whereby to control the armature speed in accordance with the magnitude of the signal voltage, a second pair of brushes engaging said commutator in generally quadrature relation to said first-mentioned pair of brushes, and means for applying the voltage developed across said second pair of brushes in degenerative fashion to said circuit.

10. In a motor control system of the character described, a motor comprising a stator having field windings and a rotatable armature having armature windings and a commutator, a constant armature current source, a pair of brushes engaging said commutator and connected to said constant current source, a source of signal voltage, a circuit including an amplifier connecting with the signal voltage and in controlling relation with said field windings whereby to control the armature speed in accordance with the magnitude of the signal voltage, a second pair of brushes engaging said commutator in generally quadrature relation to said first mentioned pair of brushes, and means for applying the voltage developed across said second pair of brushes in degenerative fashion to said amplifier.

11. In a motor control system of the character described, a motor comprising a stator having field windings and a rotatable armature having armature windings and a commutator, a constant armature current source, a pair of brushes engaging said commutator and connected to said constant current source, a source of signal voltage, a circuit including an amplifier connecting with the signal voltage and in controlling relation with said field windings whereby to control the armature speed in accordance with the magnitude of the signal voltage, a second pair of brushes engaging said commutator in generally quadrature relation to said first-mentioned pair of brushes, and means for applying the voltage developed across said second pair of brushes in degenerative fashion to said field windings.

12. A system of the character recited in claim 10 in which the armature and field windings of said motor are series connected through said quadrature brushes to provide a degenerative speed voltage effect.

13. A system of the character described, including a motor comprising a stator having differential field windings and a rotatable armature having armature windings and a commutator, a constant armature current source and a pair of brushes engaging said commutator and connected with said constant current source, a signal voltage source, a differential amplifier connected to receive the signal voltage and to supply its output to said differential field windings, a second pair of brushes engaging said commutator in generally quadrature relation to said first mentioned pair of brushes, and means for connecting said second pair of brushes in circuit with said differential windings in such manner that the voltage appearing thereacross will oppose the predominating field current.

14. In a motor control system of the character described, a motor comprising a stator having a field coil and a rotatable armature having armature windings and a commutator, a constant armature current source and a pair of brushes engaging said commutator and connected with said constant current source, a source of signal voltage, an amplifier having its input connected with said signal voltage source and its outputs being connected to pass currents in opposing relation through said field coil whereby to control said motor in accordance with said signal voltage, and a second pair of brushes engaging said commutator in generally quadrature relation to said first-mentioned pair of brushes, said quadrature brushes being connected in series with said field coil whereby the speed voltage developed thereacross will provide damping.

15. A velocity-damped motor comprising a stator having field windings and a rotatable armature having armature windings cooperating with the field developed by said field windings to produce armature torque when said field and armature windings are excited, a source of armature exciting current, a source of control voltage, a circuit connecting said control voltage in controlling relation with the motor field windings, means for deriving from said armature windings a speed voltage proportional to the speed of rotation of said armature, and means for applying said speed voltage in degenerative fashion to said circuit.

ROBERT S. CURRY, JR.

REFERENCES CITED

The following references are of record in the file of this patent:

UNITED STATES PATENTS

| Number | Name | Date |
| --- | --- | --- |
| 1,944,756 | Quarles | Jan. 23, 1934 |
| 2,131,759 | Satterlee | Oct. 4, 1938 |
| 2,412,632 | Livingston | June 3, 1947 |